United States Patent [19]

Larsen

[11] Patent Number: 4,814,951
[45] Date of Patent: Mar. 21, 1989

[54] LIGHT SYSTEM FOR A VEHICLE, IN PARTICULAR A BICYCLE

[76] Inventor: Herluf J. Larsen, DK-6100, Haderslev, Denmark

[21] Appl. No.: 120,384

[22] Filed: Nov. 12, 1987

[30] Foreign Application Priority Data

Nov. 14, 1986 [DK] Denmark .............................. 5443/86

[51] Int. Cl.$^4$ ................................................ B62J 6/00
[52] U.S. Cl. ..................................... 362/72; 362/183; 362/802; 340/432
[58] Field of Search .................... 362/72, 802, 183; 340/134; 307/117, 120, 121

[56] References Cited

U.S. PATENT DOCUMENTS

| | | | |
|---|---|---|---|
| 3,197,756 | 7/1965 | Maynard | 307/121 |
| 3,551,691 | 12/1970 | Nishimura et al. | 307/120 |
| 3,760,189 | 9/1973 | Jones, Jr. | 307/120 |
| 3,967,135 | 6/1976 | Balban et al. | 307/121 |
| 4,019,171 | 4/1977 | Martelet | 362/72 |
| 4,117,457 | 9/1978 | Latta | 340/134 |
| 4,290,047 | 9/1981 | Latta, Jr. | 340/134 |
| 4,325,108 | 4/1982 | Spingler | 362/72 |
| 4,450,351 | 5/1984 | Fraden | 362/802 |
| 4,690,242 | 9/1987 | Mark | 362/802 |
| 4,733,103 | 3/1988 | Itoh et al. | 307/117 |
| 4,751,399 | 7/1988 | Koehring | 307/117 |

Primary Examiner—Ira S. Lazarus
Assistant Examiner—Sue Hogarman
Attorney, Agent, or Firm—Antonelli, Terry & Wands

[57] ABSTRACT

A light system for a bicycle, with a plurality of lamps, a rechargeable battery and a circuit with controlling and contact means being adapted to automatically switch the lamps on and independence upon surrounding light conditions. The light system includes a sensor means adapted to sense when the bicycle is in use and cooperates with a light sensor belonging of the circuit.

7 Claims, 2 Drawing Sheets

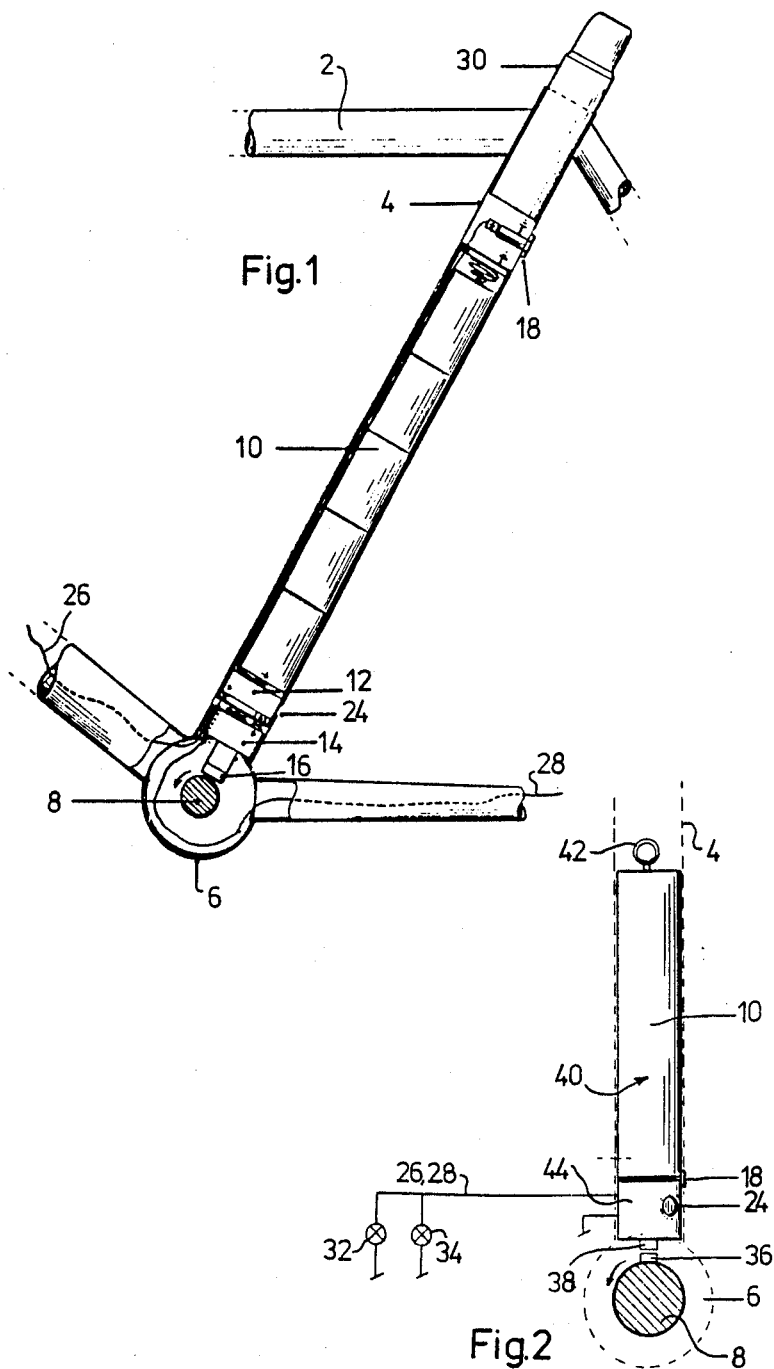

4,814,951

LIGHT SYSTEM FOR A VEHICLE, IN PARTICULAR A BICYCLE

BACKGROUND OF THE INVENTION

The present invention relates to a vehicle light system, more particularly, to a light system for a bicycle which includes a plurality of lamps, a rechargeable battery and a circuit with controlling contact means adapted to automatically respectively switch the light system on and off independent upon surrounding light condition in the introductory part of claim 1.

Many light system for bicycles have been proposed and, for example, for a considerable time, it has been recognized that conventional dynamo lamps for bicycles suffer the disadvantage of providing no light when the bicycle is standing at, for example traffic signals. Therefore a great deal of the proposed light systems for bicycles are working with a combination of a wheel or hub driven dynamo and rechargeable batteries. Theoretically these light systems have excellent function; however, in practice, the proposed light systems are inappropriate and expensive to manufacture and are often unstable in use. Also, such proposed solutions have the same disadvantage as the ordinary dynamo lamp, that is, that it influences the driving pleasure of the cyclist by requiring a tough and continuous braking effect if the dynamo is not properly maintained.

In practice therefor many cyclists prefer to use loose battery lamps mounted at the front and at the rear of the bicycles by suiteable holding members. However, loose bicycle battery lamps are rather expensive have more clear disadvantages in use. First of all people have to remember to bring along the bicycle lamps which normally are not to be left on the bicycle due to extensive theft. Unfortunately, loose battery lamps of good quality are often heavy as well as bulky for which reason many cyclists nevertheless choose to let the lamps be on the bicycle when left unattended in public places. This of course is inappropriate because it may result in the theft of loose bicycle lamps. However, a more significant factor is that many cyclists having the bicycle lamps stolen very often nevertheless choose to ride the bicycles without light in the lighting-up time period when is seen, from a road safety point of view, as being very dangerous.

The aim underlying the present invention essentially resides in providing a bicycle light system of the aforementioned type which is simple in construction and is advantageously more useful than conventional bicycle light systems.

In accordance with the present invention, the bicycle light system includes a control means having sensor means adapted to register or sense the fact that the vehicle is in use. The sensor means cooperates with a light sensor associated with an electronic circuit of the light system.

By virtue of the above-noted feature of the present invention, it is possible, in a simple manner, to not only provide the necessary capacity for the rechargeable battery but also the automatic control by virtue of the fact that the bicycle has to be in normal use in order to switch on or activate the lamps of the light system.

Advantageously, according to the present invention, the sensor means may include a magnetically operable induction sensor built into the crank of the bicycle, with the induction sensor being adapted to cooperate with a preferably permanent magnet mounted on the crank axle of the bicycle, and with the induction sensor being connected with contact means cooperating with contact means controlled by the light sensor.

The sensors means may, in accordance with the present invention, include a sound sensitive vibration sensor being connected with contact means cooperating with contact means controlled by the light sensor.

Alternatively, there may, in connection with the crank of the bicycle be mounted as well the sound sensitive vibration sensor as the magnetical opperable induction sensor with the magnet, the sensors being controllably connected with common contact means.

In most cases it would be preferred that the sensor, built into the crank housing, includes the induction sensor; but in certain cases, such as, for example if the crank housing is made of plastic, it would be most appropriate to make use of said vibration sensor. The induction sensor is constructed so as to distinguish incidental bumps on the bicycle, whereby the light system may not be switch on unintentionally in a dark bicycle shed by incidental or accidental bumping of the bicycle.

Most advantageously the rechargeable battery may be mounted in a tubeshaped housing being adapted to be positioned inside a frame tube portion of the bicycle, preferably in the saddle tube thereof, since the saddle tube is connected with the crank housing of the bicycle.

However, it would be indeed be advntageous for the whole light system with exception of the lamps and connecting wires and, possibly the magnet, to be formed as a unit and be mounted in a tubular housing being adapted to be positioned inside the saddle tube of the bicycle, with the saddle tube being provided with side openings for the light sensor and for a contact terminal being adapted to connect the rechargeable battery with an external charge unit as an opening to the crank housing being made in the bottom of the saddle tube. From the crank housing of the bicycle, the connecting wires to the lamps may chiefly be lead inside the frame of the bicycle while a front lamp may be adapted to be mounted directly on a crown tube of the bicycle.

The above objects, features, and advantages of the present invention will become more apparent from the following description when taken in connection with the accompanying drawings.

BRIEF DESCRIPTION OF THE DRAWINGS

FIG. 1 is a side view of a bicycle frame constructed with a light system according to the present invention;

FIG. 2 is a partial schematic view of another embodiment of a light system constructed in accordance with the present invention;

DETAILED DESCRIPTION

Figure 3:
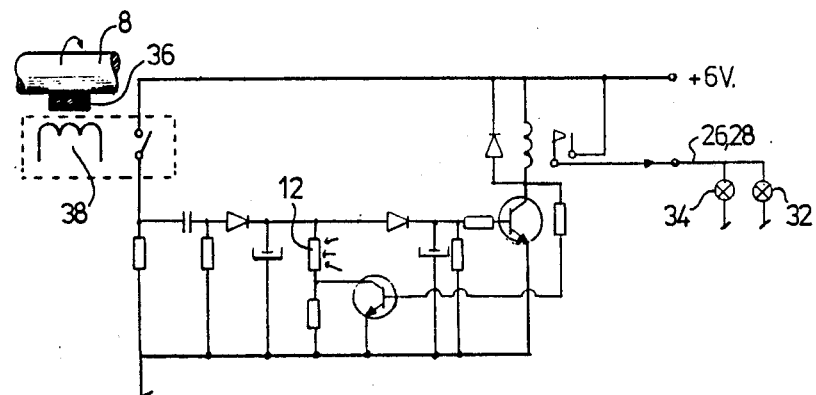
FIG. 3 is a schematic circuit diagram from the light system of FIG. 2.

Referring now to the drawings wherein like reference numerals are used throughout the various views to designate like parts and, more particularly, to FIG. 1, according to this figure, a light system is provided which is adapted to the build or incorporated into a bicycle frame 2, and, more particularly, into a saddle tube 4. The saddle tube 4 is connected, at a bottom end thereof, with a crank housing 6 accommodating a crank axle 8. The light system includes a set of rechargeable batteries 10, a photo sensor 12, a delay relay or circuit 14, and a vibration sensitive contact member 16 interconnected, for example, in the manner illustrated in FIG. 4. A plug outlet 18, for accommodating a jack plug 20, is mounted at a top end of the rechargeable batteries for enabling the light system to be connected with a conventional external charge unit 22 (FIG. 4) which, may be provided with a main plug. The photo sensor or cell 12 positioned forwardly of an opening 24 in the saddle tube 4 so that the photo sensor or cell 12, including a blue filter, may sense or register the surrounding light condition without being too sensitive, that is, without being influenced by strong artificial light influences such as, for example, lights of passing cars or other vehicles. Preferably, the photo sensor or cell 12 is only influenced by ultra-violet light having a light intensity of 1-2 lux. For the saddle tube 4 and through the crank housing 6, the front and rear lamps of the bicycle are connected by connecting wires 26, 28 depending upon the light system which may comprise one or two conductors with a common ground or frame connection.

Figure 4:
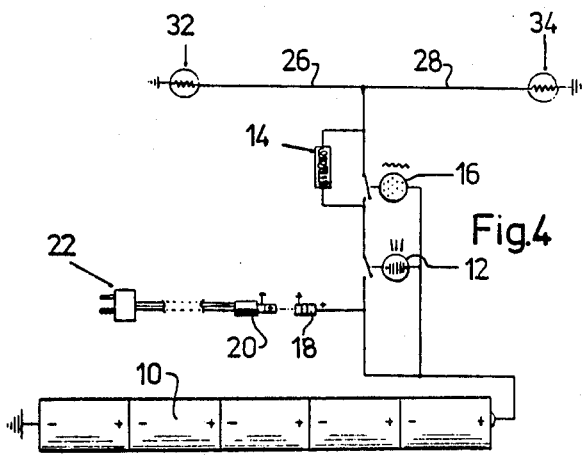
FIG. 4 is a schematic simplified electric circuit diagram for the light system of FIG. 1.

The light system of FIGS. 1 and 4 automatically functions in the following manner:

When the bicycle is in use, that is, when the crank axle i is rotated and when the photo cell 12 registers or senses a suitable low light level, the front and rear lamps of the bicycle are automatically switched on and the light is not switched off until after a predetermined delay period of about ½-1 minutes. Correspondingly, the vibration sensitive contact member 16 may be adjusted to provide a signal when succeeding vibrations are registered so that incidental or accidental bumps against the bicycle which may occur, for example, in a dark bicycle shed, do not switch the light system on. In other words, the light system automatically switches on the lamps of the bicycle when the bicycle is in use and when light is required on the bicycle. In shorter periods of non-use such as, for example, standing in traffic signals, the bicycle lamps remain switched on as the light system includes a delay relay which only after a longer period of non-use switches of the bicycle lamps. Normally a delay period of ½-1 minute may be suitable. The vibration sensitive contact member is activated by the rolling vibrations in the crank housing 6 and associated bearings; however, the contact member 16 is connected in series with the photo cell 12 as shown in FIG. 4 so that, for example, both the vibration sensitive contact member 16 and the photo cell 12 must be activated to switch on the lamps while the contact member 16 and the photo cell 12 may separately influence the light system to switch off the bicycle lamps, as with the vibration sensitive contact member 16, only after a predetermined time period of non-use is determined by the delay relay 14, and connected in parallel with the vibration sensitive contact member 16, may influence the light system to switch off the lamps. The light system is constructed as a unit and is adapted to be positioned in the saddle tube 4 under a saddle post 30, with the wires 26, 28 from the saddle tube 4, through the crank housing 6, being lead through the other frame tubes of the bicycle frame to a front lamp 32 and to a rear lamp 34, respectively, as shown in FIG. 4.

In the embodiment of FIGS. 2 and 3, a permanent magnet 36 is secured by an adhesive such as, for example, glue, to the crank axle 8. The rotation of the crank axle 8 is registered or sensed by a magnetic pick-up 38 which, as shown in FIG. 3, is part of the electronic controlling circuit of the light system and which is physically located in a top of the crank housing 6 which, for this purpose, has an opening to a suitable frame tube such as the saddle tube 4 in which the light system is preferably built in as an assembled unit (FIG. 2), that is, the light system is encapsulated in a tubular casing 40 which by an upper carrying eye 42 may be lowered or removed, respectively, from the saddle tube 4 by a suitable auxiliary tool as the casing 40 is adapted to be fixed into the saddle tube 4 by a pointed screw. The casing 40 comprises a lower part 44 in which the photo cell or photo resistor and other electronic components including the magnetic pick-up 38 are built in as the photo resistor is placed in front of the side opening 24 in the saddle tube which is also provided with an opening for a jack-plug 18 for connecting the light system with an external recharge unit.

When the crank axle 8 is rotating, current impulses are generated and electric voltage is built up over the exit (FIG. 3) for switching on the lamps 32 and 34 of the bicycle. However, a photo resistor registering the light intensity counteracts this when the light intensity corresponds to day light. By decreasing light intensity this blockade is removed and the lamps of the bicycle are switched on. A hysteresis part of the circuit (FIG. 3) prevents minor fluctuations in the light intensity influencing the controlling of the light system when the lamps are only switched on. On the other hand the lamps are automatically switched off if the crank axle 8 is not rotated for more than about 1 minute.

What I claim is:

1. A light system for a bicycle the light system built into a portion of the bicycle comprising a plurality of lamps, rechargeable battery means and a circuit with control and contact means being adapted to automatically respectively switch the light system on and off, in dependence upon surrounding light conditions, said control means comprising first sensor means adapted to sense when the bicycle is in use, and a light sensor means cooperable with said first sensor means for controlling the operation of the lamps.

2. The light system according to claim 1, wherein said first sensor means includes a magnetically operable induction sensor disposed in a crank of the bicycle, and magnetically operable induction sensor means being adapted to cooperate with a permanent magnet mounted on a crank axle of the bicycle, said magnetically operable induction sensor being connected with contact means cooperating with contact means controlled by said light sensor means.

3. A light system according to one of claims 1 or 2, wherein said first sensor means includes a sound sensitive vibration sensor disposed in a crank of the bicycle, said vibration sensor being connected with contact means cooperating with contact means controlled by said light sensor means.

4. A light system according to claim 3, wherein said sound sensitive vibration sensor and said magnetically operable induction sensor are connected by common contact means.

5. A light system according to claim 2, wherein said rechargeable battery means is mounted in a tubular casing adapted to be placed inside a saddle frame tube of the bicycle, said saddle frame tube being connected with a crank housing of the bicycle.

6. A light system according to claim 1, wherein said saddle frame tube is provided with side openings for said light sensor means and for a contact terminal adapted to connect the rechargeable battery means with an external recharge unit through an opening to the crank housing formed in the bottom of said saddle frame tube.

7. A light system according to one of claims 5 or 6, wherein the plurality of lumps are adapted to be mounted directly on a crown tube portion of the bicycle.

* * * * *